(12) United States Patent
Kasahara

(10) Patent No.: US 10,782,648 B2
(45) Date of Patent: Sep. 22, 2020

(54) IMAGE FORMING APPARATUS AND CONTROL METHOD THEREFOR

(71) Applicant: CANON KABUSHIKI KAISHA, Tokyo (JP)

(72) Inventor: Ryosuke Kasahara, Tsukubamirai (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/428,629

(22) Filed: May 31, 2019

(65) Prior Publication Data

US 2019/0369553 A1    Dec. 5, 2019

(30) Foreign Application Priority Data

Jun. 5, 2018    (JP) .................................. 2018-108113

(51) Int. Cl.
*G03G 21/20*    (2006.01)

(52) U.S. Cl.
CPC .................................... *G03G 21/20* (2013.01)

(58) Field of Classification Search
CPC .............................. G03G 21/20; G03G 21/203
See application file for complete search history.

(56) References Cited

U.S. PATENT DOCUMENTS 8,396,383 B2 *   3/2013   Honjoh ................ G03G 15/757
                                                      399/44
2018/0270381 A1 *   9/2018   Ikuta ..................... G06F 3/1219

FOREIGN PATENT DOCUMENTS

JP          2018-23081 A      2/2018

* cited by examiner

*Primary Examiner* — Susan S Lee
(74) *Attorney, Agent, or Firm* — Canon U.S.A., Inc. IP Division

(57) ABSTRACT

An image forming apparatus includes: an image forming device configured to form an image on a sheet; a fan configured to be driven to perform ventilation; and at least one controller configured to function as: a unit configured to store flag information indicating a state where a dew condensation countermeasure is required in a non-volatile memory; a unit configured to restrict image formation by the image forming device and execute dew condensation countermeasure processing to cause the fan to perform predetermined driving; and a unit configured to delete, from the non-volatile memory, the flag information upon completion of the dew condensation countermeasure processing, wherein the controller executes the dew condensation countermeasure processing upon activation of the image forming apparatus based on at least storage of the flag information in the non-volatile memory.

20 Claims, 8 Drawing Sheets

IMAGE FORMING APPARATUS AND CONTROL METHOD THEREFOR

BACKGROUND OF THE INVENTION

Field of the Invention

The present disclosure relates to an image forming apparatus including an electrophotographic recording unit.

Description of the Related Art

In an electrophotographic image forming apparatus, dew condensation may occur in the apparatus due to a change in the environment in which the apparatus is installed, e.g., the ambient temperature of the apparatus. The dew condensation that occurs in the apparatus may cause an error that occurs during image formation, or a deterioration in the image quality of an image to be formed.

When the image formation is executed under such circumstances, the quality of an output image cannot be maintained.

To deal with such a disadvantage, Japanese Patent Laid-Open No. 2018-23081 discusses a technique in which a setting called a dew condensation countermeasure mode is installed in an apparatus. In this dew condensation countermeasure mode, an apparatus internal temperature is periodically acquired to monitor a temperature change, thereby making it possible to detect the temperature change in which dew condensation may occur. Then, when the temperature change in which dew condensation may occur is detected, it is determined that dew condensation countermeasure processing is required, and ventilation by fan rotation and restriction in execution of image formation are carried out.

Incidentally, in the apparatus discussed in Japanese Patent Laid-Open No. 2018-23081, dew condensation is removed by ventilation by fan rotation, and thus it requires time from the detection of dew condensation until completion of removal of dew condensation. Accordingly, during the period from the detection of dew condensation until completion of removal of dew condensation, for example, the power supply of the apparatus is turned off, so that the dew condensation countermeasure processing may be interrupted. Thus, if the power supply of the apparatus is turned on again and the image formation is executed in a state where the removal of dew condensation is not completed, an image formation error due to dew condensation may occur.

SUMMARY OF THE INVENTION

The present disclosure is directed to providing an image forming apparatus capable of appropriately executing processing for removing dew condensation.

The present disclosure is also directed to providing an image forming apparatus including: an image forming device configured to form an image on a sheet; a fan configured to be driven to perform ventilation; and at least one controller configured to function as: a unit configured to store flag information indicating a state where a dew condensation countermeasure is required in a non-volatile memory; a unit configured to restrict image formation by the image forming device and execute dew condensation countermeasure processing to cause the fan to perform predetermined driving; and a unit configured to delete, from the non-volatile memory, the flag information upon completion of the dew condensation countermeasure processing, wherein the controller executes the dew condensation countermeasure processing upon activation of the image forming apparatus based on at least storage of the flag information in the non-volatile memory.

Further features of the present disclosure will become apparent from the following description of exemplary embodiments (with reference to the attached drawings).

DESCRIPTION OF THE EMBODIMENTS

Exemplary embodiments of the present disclosure will be described in detail below with reference to the accompanying drawings. The following exemplary embodiments are not intended to limit the invention described in the claims, and not all combinations of features described in the exemplary embodiments are essential.

First Exemplary Embodiment

A first exemplary embodiment of the present disclosure will be described.

Figure 1:
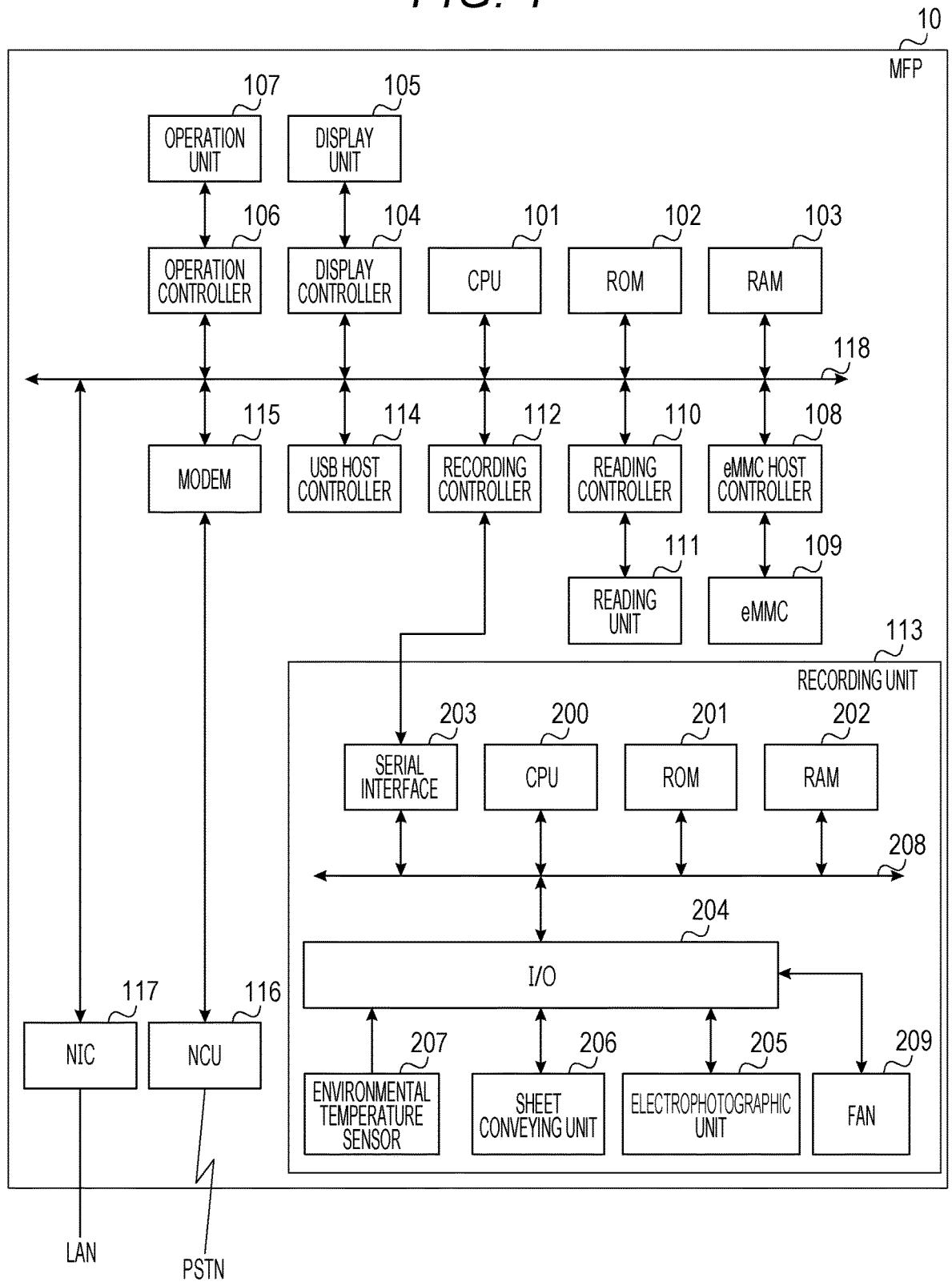
FIG. 1 is a block diagram illustrating an example of a hardware configuration of a multi-function peripheral (MFP) according to a first exemplary embodiment.

FIG. 1 is a block diagram illustrating an example of a hardware configuration of a multi-function peripheral (MFP) according to a first exemplary embodiment.

As illustrated in FIG. 1, an MFP 10 includes a central processing unit (CPU) 101, a read-only memory (ROM) 102, a random access memory (RAM) 103, a display controller 104, a display unit 105, an operation controller 106, and an operation unit 107.

The MFP 10 also includes an embedded Multi Media Card (eMMC) host controller 108, an eMMC 109, a reading controller 110, a reading unit 111, a recording controller 112, and a recording unit 113. The MFP 10 also includes a universal serial bus (USB) host controller 114, a modem 115, a net control unit (NCU) 116, and a networking interface card (NIC) 117.

The CPU 101 controls each device connected to a system bus 118. When the CPU 101 is supplied with power, the CPU 101 executes a boot program stored in the ROM 102. The CPU 101 executes the boot program and loads a main program stored in the embedded Multi MediaCard (eMMC)

109, which is a storage, into the RAM 103. Then, the loaded main program is jumped to the top thereof. The RAM 103 functions not also as the location where the main program is loaded, but also as a work area or the like for the main program.

The display controller 104 controls rendering on the display unit 105. The display unit 105 is a liquid crystal display (LCD) capable of displaying a character string of 28 characters×7 lines, ruled lines, and scroll bars. On the other hand, the operation controller 106 receives an operation input from the operation unit 107 mounted on the MFP. The operation unit 107 includes a numeric keypad, a cursor key, and a one-touch key.

The reading unit 111 reads a document. The reading unit 111 may include a document feeding apparatus. The reading unit 111 including the document feeding apparatus can automatically read a plurality of documents. The reading unit 111 is connected to the reading controller 110, and the CPU 101 transmits and receives data to and from the reading unit 111 through the reading controller 110.

Further, the recording unit 113 performs printing (image formation) on a sheet in an electrophotographic process. The recording unit 113 is connected to the recording controller 112, and the CPU 101 transmits and receives data to and from the recording unit 113 through the recording controller 112.

The USB host controller 114 performs control using a USB protocol, and intermediates an access to a USB device such as a USB memory (not illustrated).

The modem 115 performs modulation and demodulation of signals necessary for facsimile communication. The modem 115 is connected to the NCU 116. Signals modulated by the modem 115 are delivered to a public switched telephone network (PSTN) via the NCU 116.

The NIC 117 transmits and receives data to and from a mail server, a file server, a client terminal, or the like via a local area network (LAN). The LAN used in the present exemplary embodiment may be constructed by Ethernet (registered mark), or a wireless network based on IEEE 802.11.

The MFP 10 according to the present exemplary embodiment includes the eMMC 109 as a storage. The CPU 101 accesses the eMMC 109 through the eMMC host controller 108. A hard disk or a solid state drive (SSD) may be used instead of the eMMC 109.

The recording unit 113 includes a CPU 200, a ROM 201, a RAM 202, and a serial interface 203. The recording unit 113 includes an I/O 204, an image forming unit 205, a sheet conveying unit 206, and a temperature sensor 207.

When the CPU 200 is supplied with power, the CPU 200 executes a recording unit control program stored in the ROM 201. The RAM 202 functions as a work area or the like for the recording unit control program. Further, the CPU 200 receives various commands issued by the main program of the MFP 10 through the serial interface 203. In accordance with the received various commands, the image forming unit 205 and the sheet conveying unit 206 are controlled via the I/O 204 connected to a system bus 208. Further, the CPU 200 can acquire temperature measurement results by the temperature sensor 207 via the I/O 204.

The image forming unit 205 performs image formation on a sheet conveyed by the sheet conveying unit 206 by an electrophotographic process. The temperature sensor 207 is disposed in the MFP 10, for example, in the vicinity of the image forming unit 205, and measures the temperature in the vicinity of the image forming unit 205 as the apparatus internal temperature of the MFP 10. A fan 209 discharges air in the MFP 10. This generates a flow of air in the MFP 10, and a difference between the temperature within the MFP 10 and the temperature outside the MFP 10 can be reduced.

Figure 2:
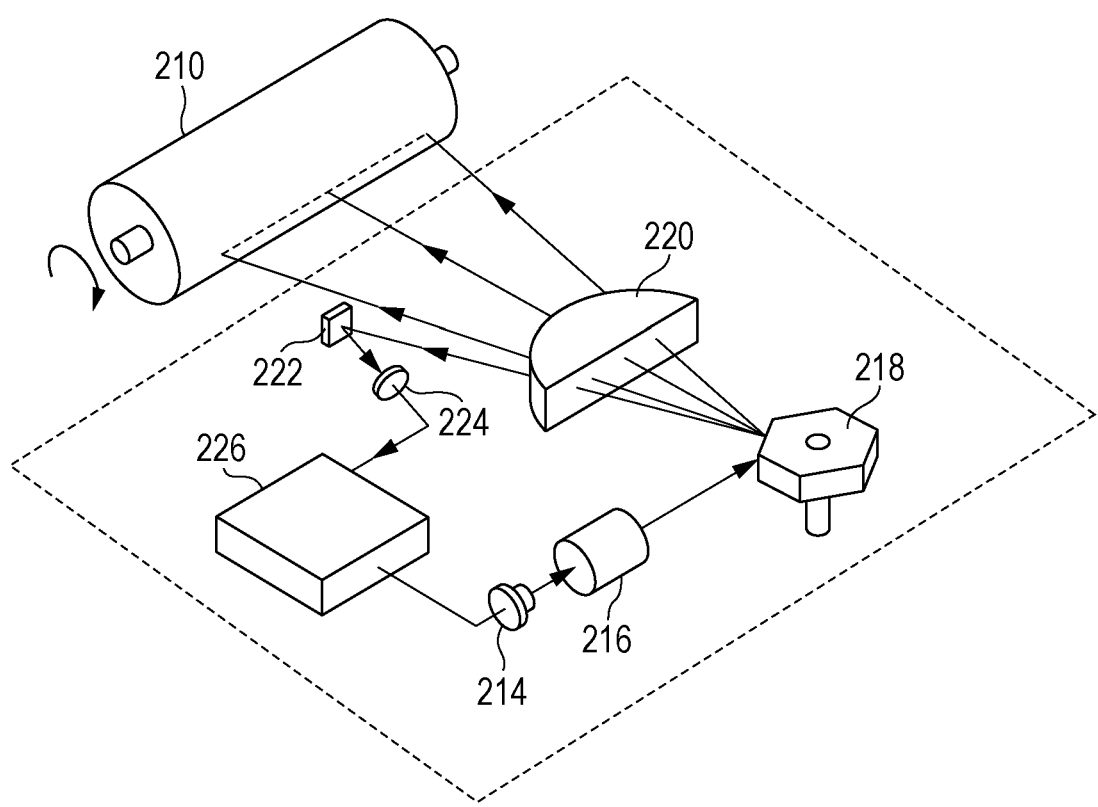
FIG. 2 is a view illustrating an example of an appearance of an optical scanning system in an image forming unit.

FIG. 2 is a view illustrating an example of an appearance of an optical scanning system (optical unit) in the image forming unit 205. A laser driving system circuit 226 is a circuit for supplying a drive current to a semiconductor laser 214 which is a light-emitting element. The semiconductor laser 214 emits a laser beam with a light emission amount corresponding to the drive current. The shape of the laser beam emitted from the semiconductor laser 214 is formed into a parallel beam by a collimator lens 216 and is scanned by an fθ lens 220 using a rotating polygon mirror 218. Then, the scanned laser beam is focused on the surface of a rolling photosensitive drum 210 by the fθ lens 220, and is scanned in the horizontal direction of the photosensitive drum 210.

On the other hand, a reflective mirror 222 is provided at a position corresponding to a scan position at one end side of the photosensitive drum 210, and a laser beam projected at a scan start position is reflected toward a beam detect (BD) detection element (synchronous signal detection element) 224. A laser beam scanning start timing is determined based on an output from the BD detection element 224.

If dew condensation occurs on the photosensitive drum 210, the dew condensation has an adverse effect on the image formation in the electrophotographic process, so that an image cannot be formed accurately in some cases. In this case, the quality of the image formed on the sheet cannot be maintained. If dew condensation occurs on the BD detection element 224, the BD detection element 224 cannot detect the laser beam in some cases. In this case, the laser beam scanning start timing cannot be determined, so that the MFP 10 is in an error state. Hereinafter, the error state in which dew condensation occurs on the BD detection element 224 and the BD detection element 224 cannot appropriately detect the laser beam is referred to as a BD error.

Figure 3:
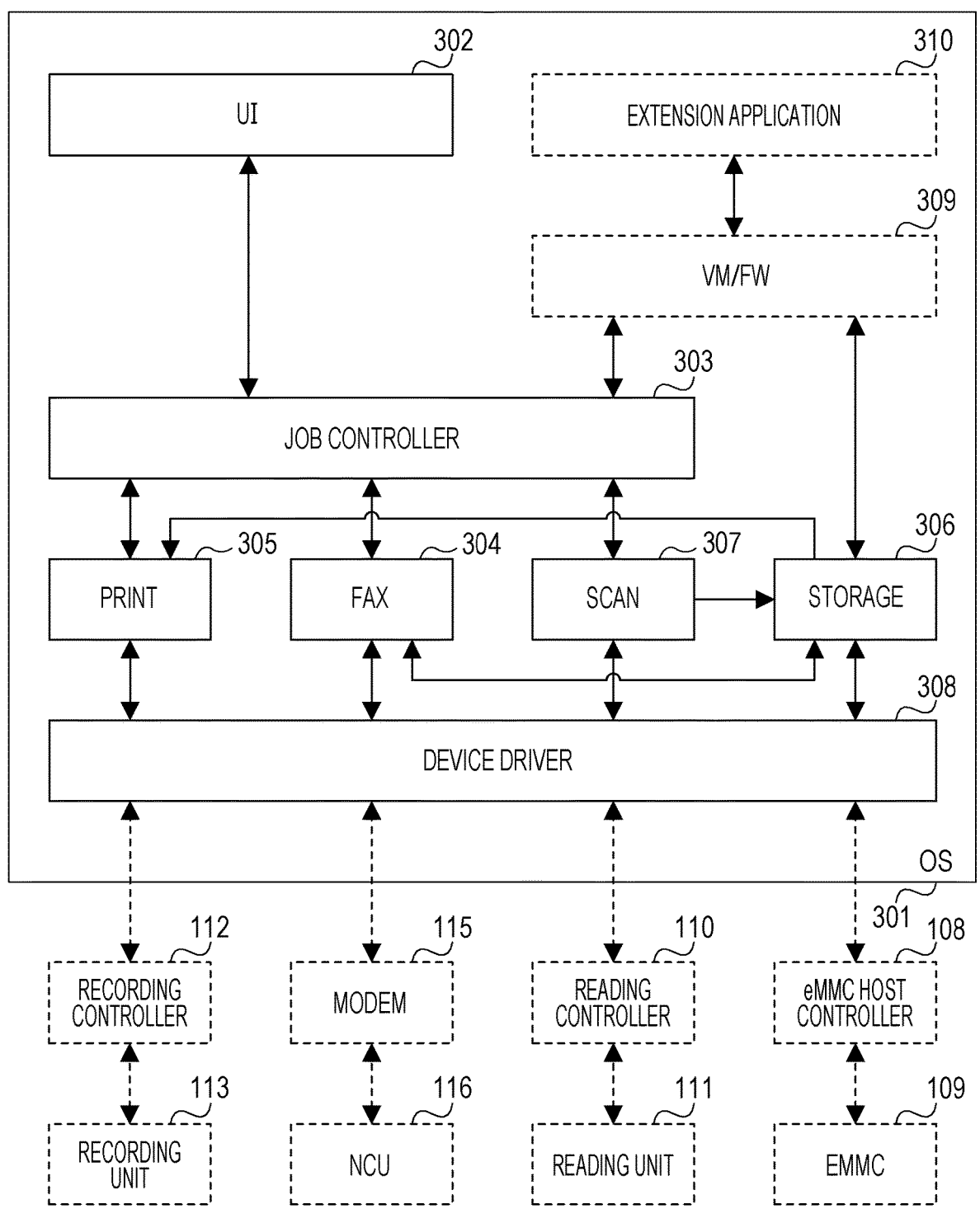
FIG. 3 is a block diagram illustrating an example of a software configuration of a multi-function peripheral (MFP) according to the first exemplary embodiment.

FIG. 3 is a block diagram illustrating an example of a software configuration of the MFP 10 according to the present exemplary embodiment. Each unit indicated by a solid line in FIG. 3 is a software module implemented in such a manner that the CPU 101 executes the main program loaded in the RAM 103 using the above-described boot program.

The main program manages and controls the execution of each module, which is described below, by an Operating System (OS) 301. The OS 301 is combined with a device driver 308. The device driver 308 intermediates exchange of data with hardware devices such as the recording controller 112 and the modem 115.

A user interface (UI) unit 302 provides a user with various information via the display unit 105 and the operation unit 107, and receives various instructions from the user.

For example, a user operation is received from the UI unit 302, and a setting content for setting ON/OFF to indicate whether to execute dew condensation countermeasure processing is stored in the eMMC 109 or the like.

The job controller 303 receives a job, such as copy, print, or facsimile, and controls the execution of the received job.

A storage unit 306 is a software module that transmits information by facsimile, or physically stores data, such as an image received by facsimile, or a user setting, in the eMMC 109 and manages the data.

For example, when the job controller 303 receives a facsimile job, the scan 307 receives the job request, controls the reading unit 111, and scans a document. Then, the scanned facsimile image data is stored in the storage unit 306. The facsimile image data stored in the storage unit 306 is read by a fax unit 304 and is transmitted by facsimile to a communication partner via the modem 115 and the NCU 116. Alternatively, the image data received by facsimile from the communication partner via the modem 115 and the NCU 116 is loaded into the fax unit 304 and is stored in the storage unit 306.

A print 305 delivers various predetermined instructions to the recording unit 113 via the recording controller 112, receives the state of the recording unit 113, and controls the operation of the recording unit 113. For example, in the case of printing the image received by facsimile, a print instruction is delivered to the recording unit 113, and then an image file stored in the storage unit 306 is read out and image data included in the image file is transferred to the recording unit 113.

When the dew condensation countermeasure processing is set to "ON" and a notification indicating that the dew condensation countermeasure processing is being executed is sent from the recording unit 113, the print 305 is caused to wait for the print instruction to the recording unit 113.

The MFP 10 includes a Virtual Machine/Framework (VM/FW) unit 309. An extension application unit 310 is composed of any program or the like described in a script language.

Figure 4:
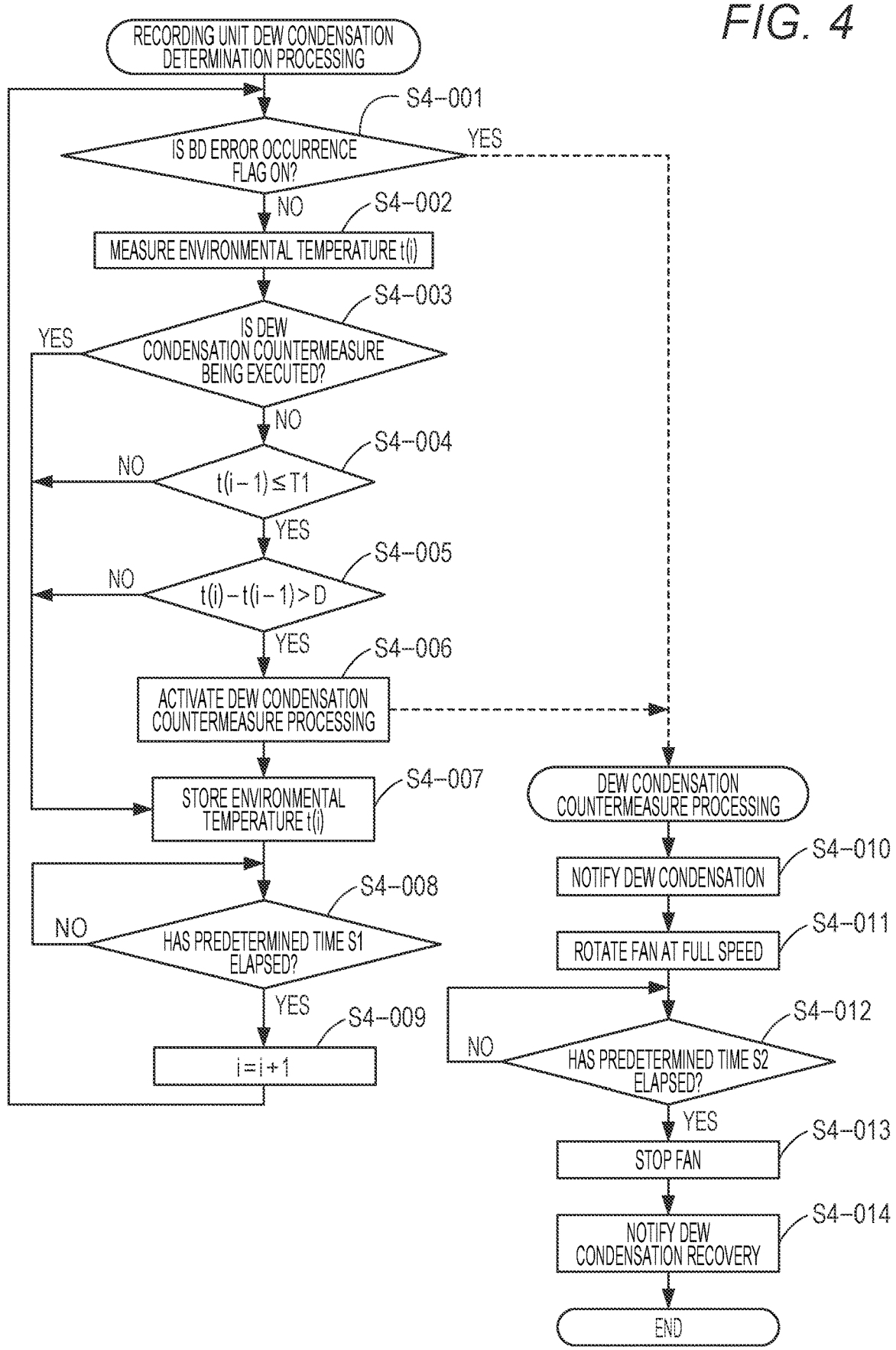
FIG. 4 is a flowchart illustrating an example of operation of dew condensation determination processing and dew condensation countermeasure processing according to the first exemplary embodiment.

FIG. 4 is a flowchart illustrating an example of operation of dew condensation determination processing and dew condensation countermeasure processing of the recording unit 113 according to the present exemplary embodiment. The processing illustrated in FIG. 4 is processing to be executed, for example, when a setting in which the MFP 10 operates in a dew condensation countermeasure mode (a mode in which dew condensation countermeasure processing is automatically executed when it is detected that dew condensation has occurred) is made by the user. This setting is received, for example, when the user sets the dew condensation countermeasure mode to "ON" via the operation unit 107. The setting content received from the user is stored in a non-volatile memory such as the eMMC 109. The flowchart illustrated in FIG. 4 is executed when the dew condensation countermeasure mode is set to "ON".

The dew condensation determination processing in steps (each step is hereinafter abbreviated as "S") S4-001 to S4-009 is a part of the recording unit control program described above with reference to FIG. 2 and is automatically executed when power is supplied to the CPU 200 of the recording unit 113. Alternatively, the CPU 101 may execute a program to thereby cause the CPU 200 to execute the dew condensation determination processing in steps S4-001 to S4-009.

First, in S4-001, the detection result of a BD error due to dew condensation is acquired, and it is determined whether the BD error has occurred. If it is determined that the BD error has occurred, the processing proceeds to the execution of the dew condensation countermeasure processing. If it is determined that the BD error has not occurred, the processing proceeds to S4-002. Next, in S4-002, a measurement result t(i) of the apparatus internal temperature of the MFP 10 is acquired from the temperature sensor 207 illustrated in FIG. 2. Next, in S4-003, it is determined whether the dew condensation countermeasure processing is being executed. If the dew condensation countermeasure processing to be described below is not being executed, the processing proceeds to S4-004. If the dew condensation countermeasure processing is being executed, the processing proceeds to S4-007.

In S4-004, it is determined whether an apparatus internal temperature t(i−1) measured before a predetermined time S1 to be described below is less than or equal to a predetermined temperature T1. The apparatus internal temperature t(i−1) acquired using the temperature sensor is stored in the RAM 202. In S4-004, the apparatus internal temperature t(i−1) is read out from the RAM 202. If the read apparatus internal temperature is less than or equal to T1, the processing proceeds to S4-005. If the read apparatus internal temperature is not less than or equal to T1, the processing proceeds to S4-007.

In S4-005, it is determined whether the difference between the environmental temperature t(i) acquired in S4-002 and the environmental temperature t(i−1) measured before a predetermined time S1 is greater than a predetermined value D. If it is determined that the difference is greater than D, the processing proceeds to D4-006. If the difference is smaller than D, the processing proceeds to S4-007.

In S4-006, when it is determined that t(i−1) is less than or equal to the predetermined temperature T1 in S4-004 and it is determined that t(i)−t(i−1) is greater than the predetermined value D in S4-005, the dew condensation countermeasure processing is activated. This indicates that at a relatively low temperature at which dew condensation is more likely to occur, there is a possibility that dew condensation may occur due to an increase in the temperature within the MFP 10 (amount of temperature change within a predetermined time). In S4-006, the dew condensation countermeasure processing is activated and the processing proceeds to S4-007.

In S4-007, the environmental temperature t(i) measured in S4-002 is stored in the RAM 202. Then, in S4-008, lapse of the predetermined time S1 is waited for. After the lapse of the predetermined time, "i" is incremented by one in S4-009, and then the processing returns to S4-001. Specifically, the environmental temperature t(i) is periodically measured at the cycle of the predetermined time S1.

The processing of steps S4-010 to S4-014 corresponds to dew condensation countermeasure processing. This dew condensation countermeasure processing is started when it is determined in S4-001 that a BD error has occurred, or when the dew condensation countermeasure processing is activated in S4-006.

First, in S4-010, a notification indicating that the dew condensation countermeasure processing is started (i.e., there is a possibility that dew condensation occurs in the MFP 10) is sent to the CPU 101 via the serial interface 203 (this notification is hereinafter referred to as a dew condensation removal operation notification).

The CPU 101 executes the main program and when the main program recognizes the reception of the dew condensation removal, a dew condensation countermeasure processing flag stored in the RAM 103 is set to "ON". The dew condensation countermeasure processing flag is a flag that is turned on when the dew condensation countermeasure processing is being executed the recording unit 113.

Next, in S4-011, the fan 209 included in the image forming unit 205 is rotated at full speed. This is an operation to promote following the apparatus internal temperature with respect to the temperature outside the MFP 10, removing dew condensation that has occurred in the MFP 10, or recovering the state from the state where dew condensation is likely to occur.

In the present exemplary embodiment, the fan 209 is rotated at full speed as the dew condensation countermeasure processing. Alternatively, the fan 209 may be rotated at a rotational speed other than the full speed, as long as the advantageous effect of removing dew condensation can be obtained.

In S4-012, the standby state is continued until the lapse of a predetermined time S2 while the fan 209 is rotated.

The predetermined time S2 is a predetermined time in which drew condensation within the MFP 10 is expected to be removed if the fan 209 is rotated at full speed.

After the lapse of the predetermined time S2, the processing proceeds to S4-013 and then the fan is stopped. If the fan 209 is rotated at a predetermined rotational speed before S4-011 is executed, the fan is reset to the predetermined rotational speed without stopping the fan in S4-013.

Then, in S4-014, a notification indicating that the dew condensation countermeasure processing is terminated (i.e., it is highly likely that drew condensation within the MFP 10 has been removed) is sent to the CPU 101, like in S4-010, and then the dew condensation countermeasure processing is terminated.

The CPU 101 that has received the notification indicating that the dew condensation countermeasure processing is terminated sets the dew condensation countermeasure processing flag to "OFF". Further, when the BD error flag is set to "ON", the BD error flag is also set to "OFF". In other words, an ON flag for the dew condensation countermeasure processing and an ON flag for the BD error are deleted.

By each processing in this flow, when it is determined that it is necessary to execute the dew condensation countermeasure processing, the dew condensation countermeasure processing can be automatically executed.

Since there is a possibility that the quality of an image to be formed may deteriorate during the execution of the dew condensation countermeasure processing, it is preferable to prevent image formation involved in execution of a job from being executed.

Figure 5:
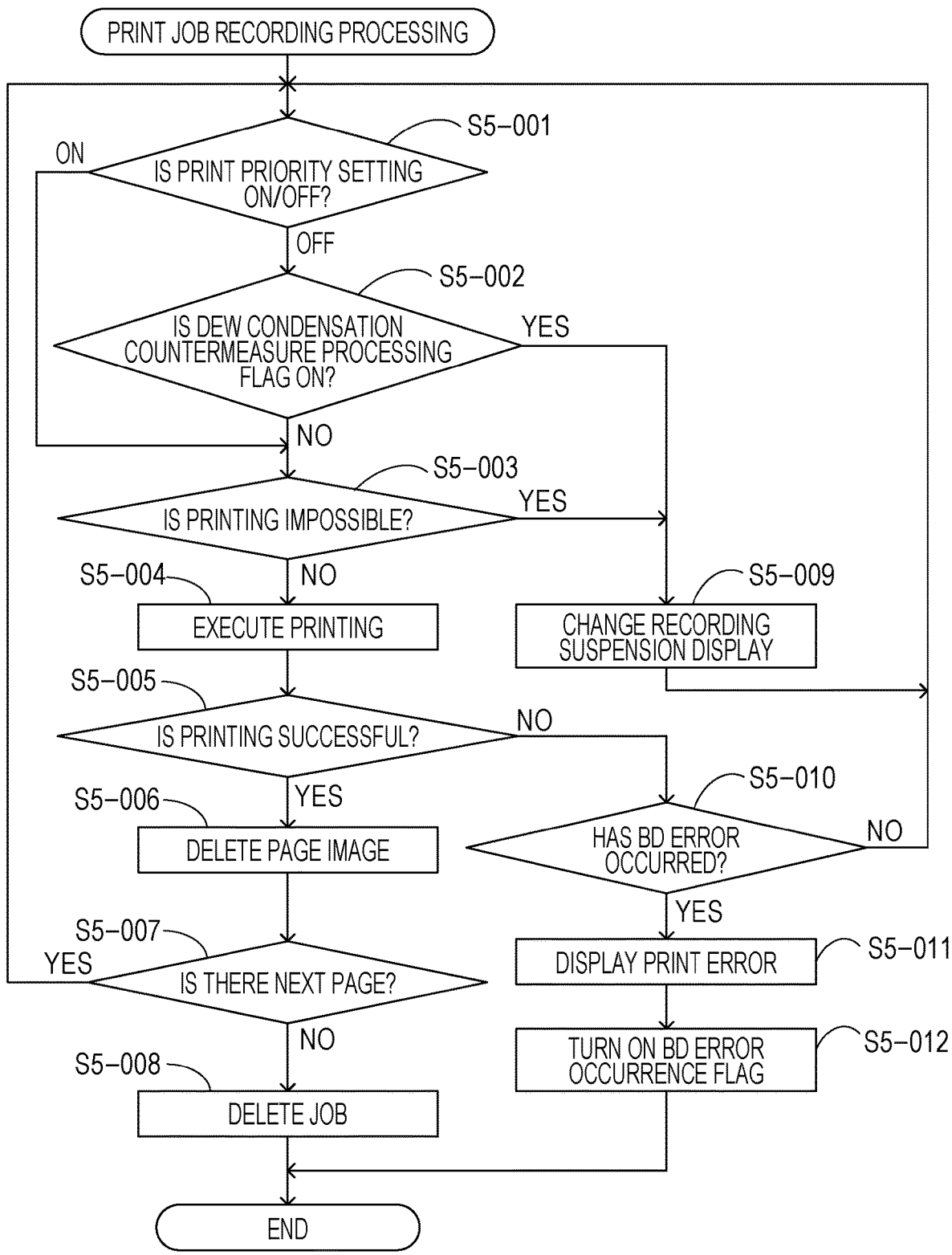
FIG. 5 is a flowchart illustrating an example of a print operation of a received print job according to the first exemplary embodiment.

FIG. 5 is a flowchart illustrating an example of processing to be executed when print processing for a PC print job is performed according to the present exemplary embodiment. Each step illustrated in the flowchart of FIG. 5 is implemented in such a manner that the CPU 101 executes the main program loaded in the RAM 103. Specifically, the flowchart executed by a part of the program constituting the print 305 is executed.

A job in which print data transmitted from a personal computer (PC), which is an example of an information processing apparatus outside the MFP 10, is received via the NIC 117, and printing is executed based on the received print data is referred to as a PC print job.

The image forming apparatus according to the present exemplary embodiment can preliminarily set whether to permit the execution of printing based on the PC print job during execution of the dew condensation countermeasure processing in the recording unit 113.

This setting is referred to as a print priority setting. The print priority setting is performed in accordance with an instruction from the user or administrator of the MFP 10 through the operation unit 107, and the setting content is stored in the eMMC 109. Even when the print priority setting is ON, printing based on the image data received by facsimile is not permitted during the dew condensation countermeasure processing.

First, in S5-001, the setting content of the print priority setting is confirmed. If the print priority setting is OFF, the processing proceeds to S5-002. If the print priority setting is ON, the processing skips S5-002 and proceeds to S5-003. Specifically, if the print priority setting is ON, printing based on the PC print job is executed even when the dew condensation countermeasure processing flag is turned on. When the dew condensation countermeasure processing flag is turned on, the recording unit 113 is supposed to execute the dew condensation countermeasure processing while preventing the image formation from being executed. However, turning on of the dew condensation countermeasure processing flag indicates that there is a possibility that dew condensation occurs, and it is uncertain whether dew condensation has actually occurred in the MFP 10.

Further, if the MFP 10 is affected by dew condensation and the quality of an image output after printing based on the PC print job is performed is deteriorated, the user can issue a print instruction from the PC again. Accordingly, if the user wishes to avoid the execution of the PC print job in response to the print instruction since the image processing apparatus in which the occurrence of dew condensation is detected has interrupted printing, the print priority setting may be turned on.

In S5-002, it is determined whether the dew condensation countermeasure processing flag is set to "ON".

If it is determined that the dew condensation countermeasure processing flag is not set to "ON", the processing proceeds to S5-003. On the other hand, if it is determined that the dew condensation countermeasure processing flag is set to "ON", the processing proceeds to S5-009.

In S5-003, it is determined whether the recording unit 113 is ready to execute printing. If sheet empty, door open, sheet jam, or the like does not occur and it is determined that the recording unit 113 is ready to execute printing, the processing proceeds to S5-004. On the other hand, if sheet empty, door open, sheet jam, or the like occurs and if it is determined that the recording unit 113 is not ready to execute printing, the processing proceeds to S5-009.

In S5-004, printing based on image data corresponding to one page to be printed is executed. Subsequently, it is determined whether printing is successful in S5-005. If it is determined that printing is successful, the processing proceeds to S5-006. On the other hand, if it is determined that printing is unsuccessful because misprinting has occurred due to the occurrence of sheet jam or mismatch of sheet sizes, the processing proceeds to S5-010.

In S5-006, the image data for which it is determined that printing is successful is deleted from the eMMC 109.

In S5-007, it is determined whether the image data corresponding to the next one page to be printed is present. If it is determined that the image data corresponding to the next one page to be printed is present, the processing returns to S5-001 to perform printing based on the image data corresponding to the next one page. If it is determined that the image data corresponding to the next one page to be printed is not present, the processing proceeds to S5-008.

In S5-008, management information about the print job corresponding to all pages and in which printing based on image data has been completed is deleted from the eMMC 109, and then print processing for the print job is terminated.

On the other hand, in S5-009, the UI unit 302 is requested to display, on the display unit 105, a message indicating that the print processing by executing the print job is suspended because the occurrence of dew condensation is detected, or recording cannot be performed.

In S5-010, it is determined whether the BD error has occurred as a cause of failure in printing. If it is determined that the BD error has occurred, the processing proceeds to S5-011. If it is determined that the BD error has not occurred, the processing proceeds to S5-001.

In S5-011, the UI unit 302 is requested to display, on the display unit 105, a message indicating that there is a possibility that an error has occurred in the execution of the PC print job because the occurrence of dew condensation is detected, or prompting the user to turn on the dew condensation removal mode (prompt the permission of execution of dew condensation countermeasure processing).

In S5-012, a flag indicating the occurrence of the BD error (dew condensation occurrence information) is stored in the eMMC 109 which is a non-volatile memory.

After the occurrence of the BD error, it is necessary to turn off the power supply once and then turn on the power supply so as to allow the MFP 10 to be normally returned. Accordingly, the UI unit 302 is requested to display, on the display unit 105, a message for prompting the user to turn on the power supply again. The normal return refers to an operation from when the power supply is turned on to activate the apparatus until the main program is executed again to shift to a standby state.

Figure 6:
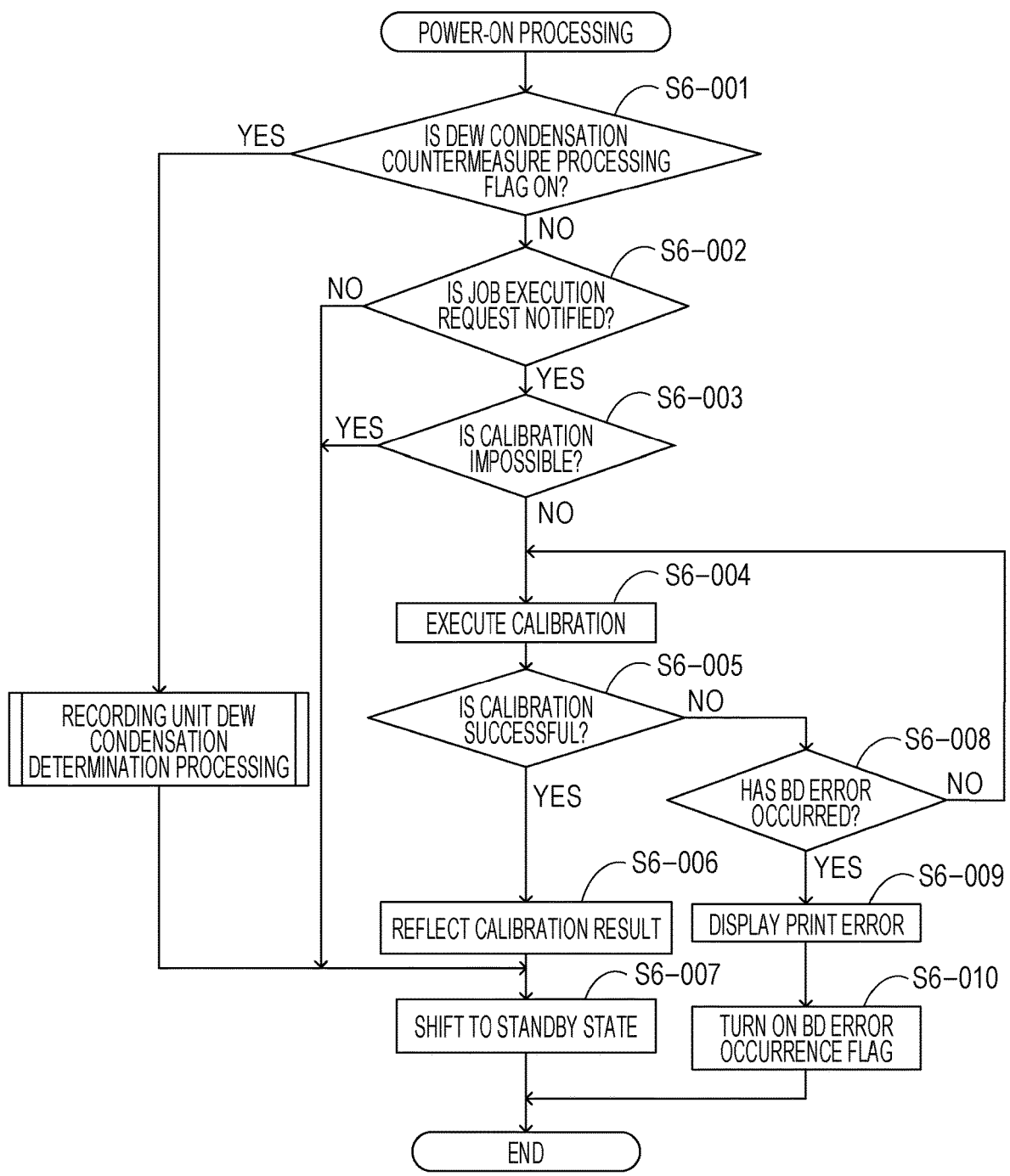
FIG. 6 is a flowchart illustrating an example of processing at the time of power activation according to the first exemplary embodiment.

FIG. 6 is a flowchart illustrating an example of an initial operation to be executed by the recording unit 113 when the power supply of the MFP 10 is turned on (power on) according to the present exemplary embodiment. Each step illustrated in the flowchart of FIG. 6 is implemented in such a manner that the CPU 101 executes the main program loaded into the RAM 103.

In S6-001, it is determined whether the BD error occurrence flag stored in the eMMC 109 is set to "ON" (whether the dew condensation occurrence information is stored in the storage unit).

If it is determined that the BD error occurrence flag is not set to "ON", the processing proceeds to S6-002. On the other hand, if it is determined that the BD error occurrence flag is set to "ON", it is determined that the occurrence of the BD error has been detected before the power supply is turned on this time, i.e., before the power supply is turned off previously. Then, the processing proceeds to the recording unit dew condensation determination processing (S4-001) to execute the dew condensation countermeasure processing.

In S6-002, at the time of power activation, it is determined whether a job execution request is notified. An example of the job that is requested to be executed in this case is a calibration job for correcting a deviation in the density of an image to be formed, or a positional deviation in a sub-scanning direction of an image to be formed, due to an environmental variation or a lapse of a predetermined time. However, the job is not limited to this example. A print job or a facsimile job may be set as the job to be requested for execution. If the request for executing the calibration job is notified, the processing proceeds to S6-003. If the request is not notified, the processing proceeds to S6-007.

In S6-003, it is determined whether an engine is ready to execute the calibration job. If it is determined that the engine cannot operate due to sheet jam or the like and is not ready to execute the calibration job, the processing proceeds to S6-007. On the other hand, if it is determined that the engine is ready to execute the calibration job, the processing proceeds to S6-004.

In S6-004, the engine executes the calibration job.

In S6-005, it is determined whether the calibration job is successful. If it is determined that the calibration job is successful, the processing proceeds to S6-006. If it is determined that the calibration job is unsuccessful due to a failure in reading of patch data for correction, the processing proceeds to S6-008.

In S6-006, the correction result obtained by executing the calibration job is reflected in the eMMC 109. This processing is processing required when the job to be executed is the calibration job. If the job to be executed is the print job, the execution of S-006 may be omitted.

In S6-007, the initial operation of the engine is completed, and the engine shifts to the standby state.

In S6-008, it is determined whether the calibration job is unsuccessful due to the occurrence of the BD error. If it is determined that the calibration job is unsuccessful due to the occurrence of the BD error, the processing proceeds to S6-009. If it is determined that the calibration job is unsuccessful due to a factor other than the BD error, the processing proceeds to S6-004 again to execute the calibration job again.

In S6-009, the UI unit 302 is requested to display, on the display unit 105, a message indicating that there is a possibility that an error has occurred in the execution of the PC print job because the occurrence of dew condensation is detected (the state in which the dew condensation countermeasure is required), or prompting the user to turn on the dew condensation removal mode.

In S6-010, a flag indicating the occurrence of the BD error is stored in the eMMC 109.

According to the present exemplary embodiment, even when the power supply of the image forming apparatus is turned off in a state where drew condensation countermeasure processing is not performed for dew condensation that has occurred in the apparatus, a state where information indicating that the occurrence of dew condensation is detected in the apparatus is preliminarily stores can be maintained. Therefore, the occurrence of dew condensation detected in the apparatus before the power supply is turned on (occurrence of a state where the dew condensation countermeasure is required) can be detected even after the power supply is turned on. Thus, the image formation can be started after the dew condensation removal processing is executed after the power supply is turned on. Consequently, the quality of an image to be formed can be maintained.

Second Exemplary Embodiment

In the first exemplary embodiment, the message promoting setting of the dew condensation removal mode is displayed on the display unit 105 immediately after the occurrence of the BD error. However, a message indicating that there is a possibility that an error has occurred due to dew condensation when the power supply is turned off once and then turned on (turned on again) after the occurrence of the BD error, or prompting the user to turn on the dew condensation removal mode may be displayed.

Figure 7:
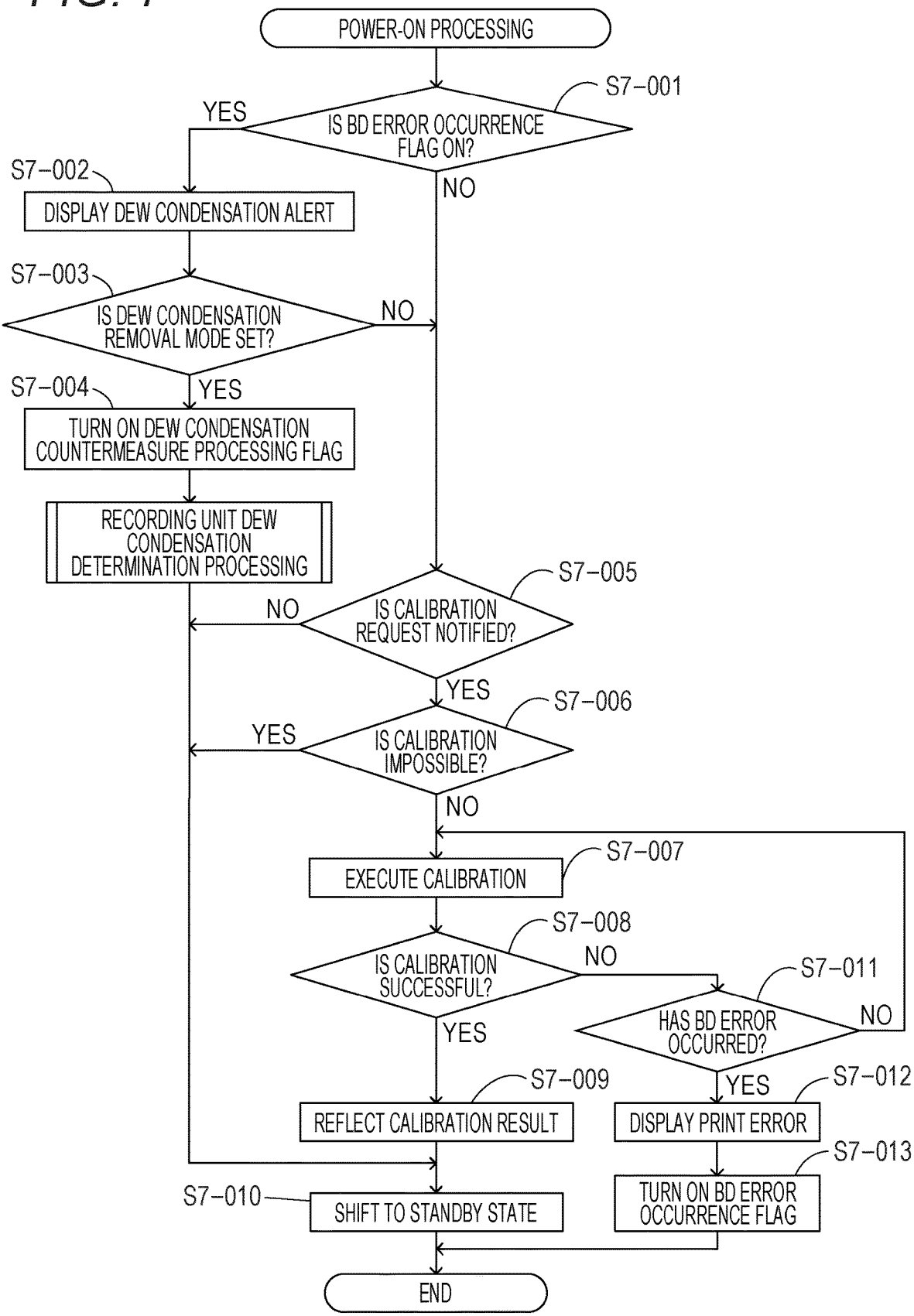
FIG. 7 is a flowchart illustrating an example of processing at the time of power activation according to a second exemplary embodiment.

FIG. 7 is a flowchart illustrating an example of the initial operation to be executed by the recording unit 113 when the power supply of the MFP 10 is turned on (power on) according to the present exemplary embodiment.

In S7-001, it is determined whether the DB error occurrence flag stored in the eMMC 109 is set to "ON".

If it is determined that the BD error occurrence flag is not set to "ON", the processing proceeds to S7-005. If it is determined that the BD error occurrence flag is set to "ON", the processing proceeds to S7-002.

In S7-002, the UI unit 302 is requested to display, on the display unit 105, a message indicating that there is a possibility that an error has occurred due to dew condensation when the power supply is previously turned off, or prompting the user to turn on the dew condensation removal mode.

In S7-003, it is determined whether the user sets the dew condensation removal mode in accordance with the message in S7-002. If it is determined that the dew condensation removal mode is set, the processing proceeds to S7-004. If it is determined that the dew condensation removal mode is not set, the processing proceeds to S7-005.

In S7-004, the dew condensation countermeasure processing flag stored in the RAM 103 is set to "ON".

The processing of S7-005 and subsequent steps is similar to processing of S6-002 and subsequent steps illustrated in FIG. 6.

According to the present exemplary embodiment, it is possible to prompt the user to perform the dew condensation removal processing after the power supply is turned on and to set the dew condensation removal mode.

Third Exemplary Embodiment

A third exemplary embodiment describes an example in which processing to be performed in the power-on state is changed depending on the length of time during the power-off state after the occurrence of the BD error.

Figure 8:
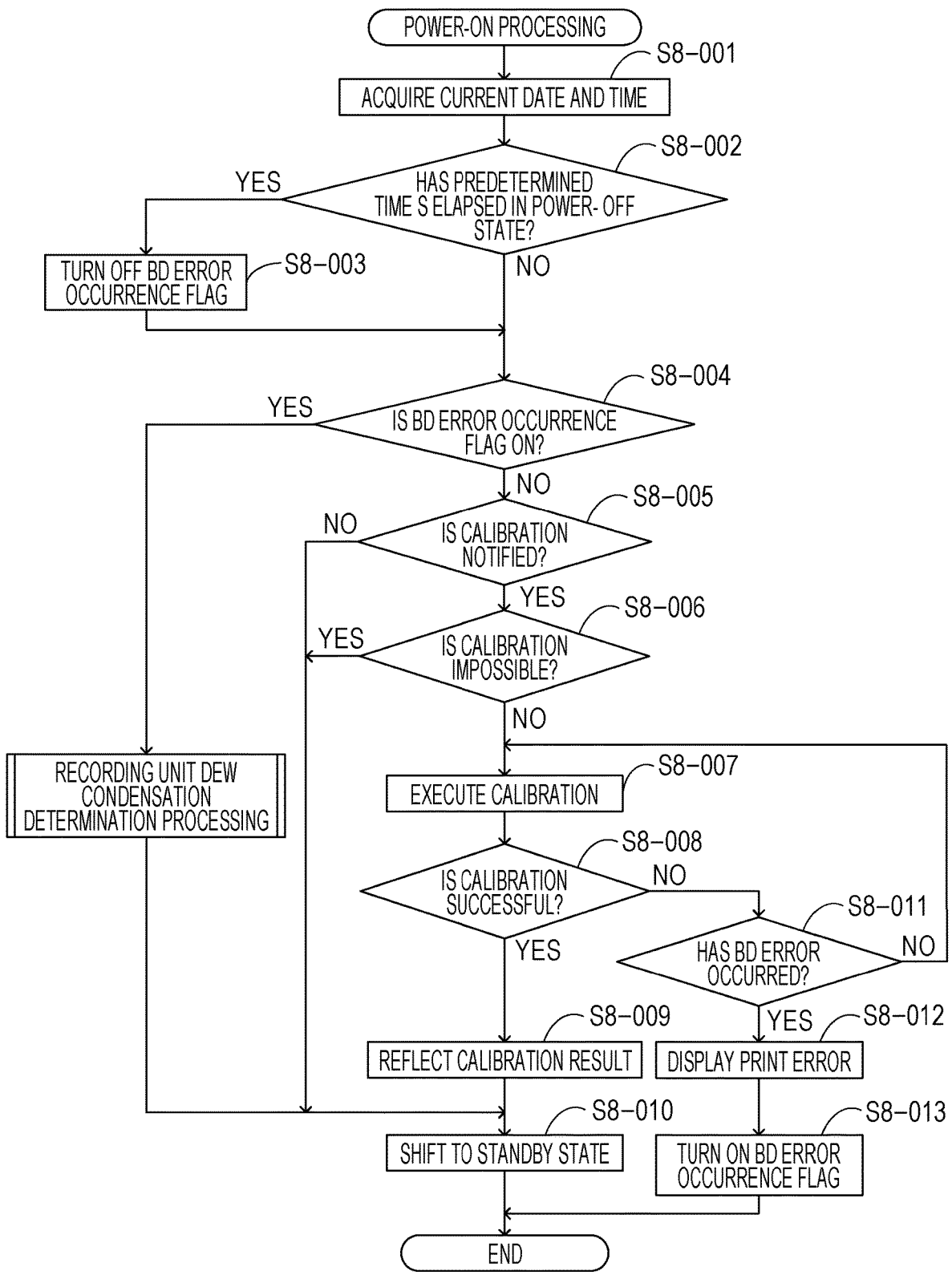
FIG. 8 is a flowchart illustrating an example of processing at the time of power activation according to a third exemplary embodiment.

FIG. 8 is a flowchart illustrating an example of the initial operation to be executed by the recording unit 113 when the power supply of the MFP 10 is turned on (power on) according to the present exemplary embodiment. Each step illustrated in the flowchart of FIG. 8 is implemented in such a manner that the CPU 101 executes the main program loaded into the RAM 103.

In S8-001, the current time is acquired and stored in the RAM 103.

In S8-002, the time during which the power is off is calculated on the basis of the time when information is stored in the eMMC 109 upon power-off and the time when information is stored in the RAM 103 in S8-001, and it is determined whether the time during which the power supply is off is longer than a predetermined time S3. The predetermined time S3 indicates a time required for the apparatus internal temperature of the main body to naturally follow the environmental temperature and the dew condensation that has occurred to be removed after the occurrence of dew condensation. If it is determined that the time during which the power supply is off is longer than the predetermined time S3, the processing proceeds to S8-003. If it is determined that the time during which the power supply is off is not longer than the predetermined time S3, the processing proceeds to S8-004. This time information is information to be associated with the BD error occurrence flag.

In S8-003, it is determined that the dew condensation state is naturally removed, the BD error occurrence flag of the eMMC 109 is cleared.

The processing of S8-004 and subsequent steps is similar to processing of S6-002 and subsequent steps illustrated in FIG. 6.

According to the present exemplary embodiment, it is possible to determine whether there is a possibility that the dew condensation that has occurred is removed depending on a period from the time when the power supply is turned off until the power supply is turned on again.

Thus, at the time of power activation, it is possible to more accurately inform the user of whether dew condensation has occurred in the apparatus.

Other Embodiments

The present disclosure can also be implemented by processing in which a program for implementing one or more functions according to the exemplary embodiments described above is supplied to a system or apparatus via a network or storage medium, and one or more processors in a computer of the system or apparatus read and execute the program. The present disclosure can also be implemented by a circuit (e.g., an application specific integrated circuit (ASIC)) for implementing one or more functions.

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-108113, filed Jun. 5, 2018, which is hereby incorporated by reference herein in its entirety.

What is claimed is:

1. An image forming apparatus comprising:
an image forming device configured to form an image on a sheet;
a fan configured to be driven to perform ventilation; and
at least one controller configured to function as:
a unit configured to store flag information indicating a state where a dew condensation countermeasure is required in a non-volatile memory;
a unit configured to restrict image formation by the image forming device and execute dew condensation countermeasure processing to cause the fan to perform predetermined driving; and
a unit configured to delete, from the non-volatile memory, the flag information upon completion of the dew condensation countermeasure processing,
wherein
the controller executes the dew condensation countermeasure processing upon activation of the image forming apparatus based on at least storage of the flag information in the non-volatile memory.

2. The image forming apparatus according to claim 1, wherein
the image forming device includes an optical unit that uses a laser beam, and
the controller determines, based on a detection result of the laser beam, the state where the dew condensation countermeasure is required.

3. The image forming apparatus according to claim 1, further comprising a sensor configured to detect an ambient temperature, wherein the controller determines the state where the dew condensation countermeasure is required, based on temperature information acquired at a plurality of timings from the sensor.

4. The image forming apparatus according to claim 1, wherein
the controller stores the flag information in association with time information, and
the controller executes the dew condensation countermeasure processing upon activation of the image forming apparatus based on at least storage of the flag information associated with the time information satisfying a predetermined condition in the non-volatile memory.

5. The image forming apparatus according to claim 1, wherein
the controller deletes the flag information from the non-volatile memory based on a lapse of time.

6. The image forming apparatus according to claim 1, wherein
the predetermined driving is driving for rotating the fan at a predetermined rotational speed.

7. The image forming apparatus according to claim 1, wherein
the image formation restricted in dew condensation countermeasure processing is image formation based on reception of print data.

8. The image forming apparatus according to claim 1, wherein
the image formation restricted in the dew condensation countermeasure processing is image formation involved in adjustment processing of the image forming device.

9. The image forming apparatus according to claim 1, further comprising a display device configured to display information, wherein
the controller causes the display device to display a predetermined message upon determining the state where the dew condensation countermeasure is required.

10. The image forming apparatus according to claim 9, wherein
the predetermined message is a message to prompt permission of execution of the dew condensation countermeasure processing.

11. The control method according to claim 1, wherein
the image forming apparatus stores the flag information in association with time information, and
the image forming apparatus executes the dew condensation countermeasure processing upon activation of the image forming apparatus based on at least storage of the flag information in association with time information satisfying a predetermined condition in the non-volatile memory.

12. The control method according to claim 1, wherein
the image forming apparatus deletes the flag information from the non-volatile memory based on a lapse of time.

13. The control method according to claim 1, wherein
the predetermined driving is driving for rotating the fan at a predetermined rotational speed.

14. The image forming apparatus according to claim 1, wherein
the image formation restricted in the dew condensation countermeasure processing is image formation based on reception of print data.

15. The control method according to claim 1, wherein
the image formation restricted in the dew condensation countermeasure processing is image formation involved in adjustment processing of the image forming device.

16. The control method according to claim 1, wherein
the image forming apparatus further comprises a display device configured to display information, and
a message to prompt permission of execution of the dew condensation countermeasure processing is displayed on the display device upon determining the state where the dew condensation countermeasure is required.

17. A control method for an image forming apparatus including an image forming device configured to form an image on a sheet and a fan configured to be driven to perform ventilation, the control method comprising:
determining a state where a dew condensation countermeasure is required, and storing flag information in a non-volatile memory;
restricting image formation by the image forming device, and executing dew condensation countermeasure processing to cause the fan to perform predetermined driving; and
deleting, from the non-volatile memory, the flag information upon completion of the dew condensation countermeasure processing,
wherein
the image forming apparatus executes the dew condensation countermeasure processing upon activation of the image forming apparatus based on at least storage of the flag information in the non-volatile memory.

18. The control method according to claim 17, wherein
the image forming device includes an optical unit that uses a laser beam, and the image forming apparatus determines, based on a detection result of the laser beam, the state where the dew condensation countermeasure is required.

19. The control method apparatus according to claim 17, wherein
the image forming apparatus further comprises a sensor configured to detect an ambient temperature, and
the image forming apparatus determines the state where the dew condensation countermeasure is required, based on temperature information acquired at a plurality of timings from the sensor.

20. A storage medium storing a program for causing a computer to execute a control method for an image forming apparatus including an image forming device configured to form an image on a sheet and a fan configured to be driven to perform ventilation, the control method comprising:
determining a state where a dew condensation countermeasure is required, and storing flag information in a non-volatile memory;
restricting image formation by the image forming device, and executing dew condensation countermeasure processing to cause the fan to perform predetermined driving; and
deleting, from the non-volatile memory, the flag information upon completion of the dew condensation countermeasure processing,
wherein
the image forming apparatus executes the dew condensation countermeasure processing upon activation of the image forming apparatus based on at least storage of the flag information in the non-volatile memory.

* * * * *